W. V. TURNER.
FLUID PRESSURE BRAKE.
APPLICATION FILED OCT. 21, 1915.
1,190,342.
Patented July 11, 1916.
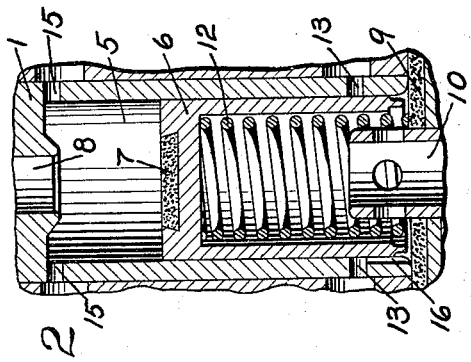
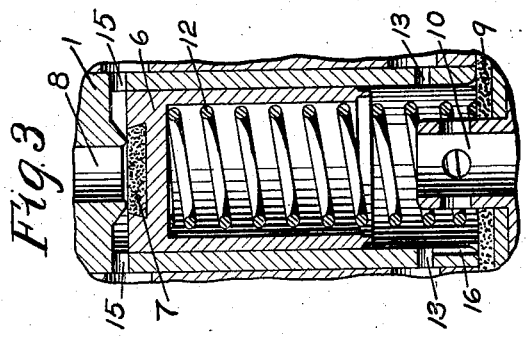
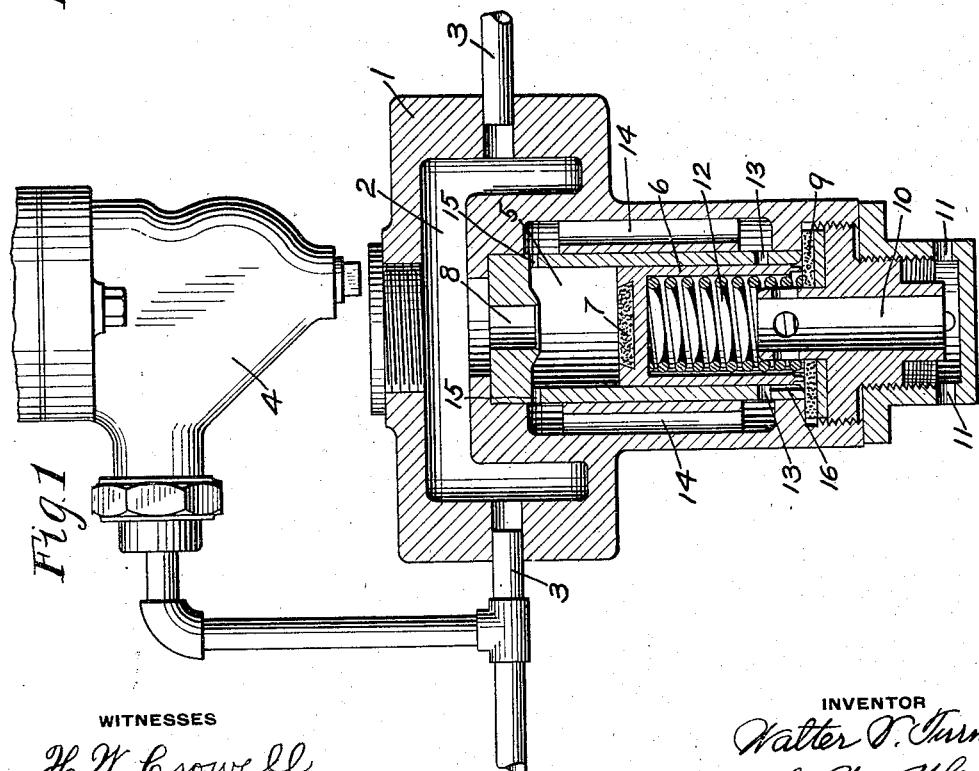
WITNESSES
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,190,342.  Specification of Letters Patent.  Patented July 11, 1916.

Application filed October 21, 1915. Serial No. 57,057.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a valve device for effecting a reduction in brake pipe pressure when the pressure in the brake pipe is reduced to a predetermined degree.

Brake pipe vent valves of the above type are known as "protection valves" and one of the principal purposes is to automatically cause an emergency application of the brakes in case of a slow leak in brake pipe pressure, which with the usual brake apparatus might bleed down the brake pipe without causing an application of the brakes and without otherwise indicating to the operator that a brake pipe leak exists. Prior devices of this character operate satisfactorily to accomplish the desired result, but in some instances, as where an attendant is working under a car, if the brakes are suddenly applied in emergency by the operation of a protection valve, he may be in such a position as to run the chance of injury, since there would be no preliminary warning that an emergency application is about to take place.

The principal object of my invention is to provide a vent valve device of the above character in which the device initially vents fluid from the brake pipe at a slow service rate to give warning that the brakes are about to be applied and then the same opens to vent fluid from the brake pipe at the usual emergency rate.

In the accompanying drawings; Figure 1 is a sectional view of an automatic brake pipe vent valve device embodying my improvement and shown applied in connection with a triple valve device; Fig. 2 a fragmentary sectional view of the vent valve device in the position for venting fluid from the brake pipe at a service rate; and Fig. 3 a view similar to Fig. 2, showing the vent valve in its closed position.

As shown, the vent valve device may comprise a casing 1 having a passage 2 forming part of the brake pipe 3 which is connected in the usual manner with a triple valve device 4 on each car of the train. The casing 1 has a piston chamber 5 containing a valve piston 6, provided at one end with a valve seat 7 adapted to control communication through a passage 8 connecting the brake pipe passage 2 with chamber 5. The opposite end of the valve piston 6 is adapted to engage a seat 9 upon movement to its extreme outer position and cut off communication to a passage 10 which opens to the atmosphere through ports 11. A coil spring 12 acts on the valve piston 6 in a direction tending to move the same inwardly and ports 13 lead from the outer end of piston chamber 5 through passages 14 to ports 15 which open into said piston chamber at its inner end.

In operation, when fluid is supplied to the brake pipe 3, the pressure acts on the exposed area of the seat 7 of valve piston 6 and upon the brake pipe pressure rising to a degree sufficient to overcome the resistance of the spring 12, the valve piston is lifted from its seat, exposing the full area of the valve piston to brake pipe pressure. The sudden increase in area exposed to brake pipe pressure then causes the prompt and positive movement of the valve piston to its outer normal position against the seat 9.

If the brake pipe pressure becomes reduced from any cause to a predetermined degree, sufficient to overcome the tension of the spring 12, the valve piston will move inwardly and open communication through a restricted passage 16, so that fluid will be vented from the brake pipe at a service rate through passage 8, chamber 5, ports 15, passages 14, and ports 13. The continued inward movement of the valve piston 6 then uncovers the ports 13, so that the rate of reduction in brake pipe pressure is increased to the emergency rate and finally, the valve piston moves to its extreme inner position, closing communication to the brake pipe at the seat 7, as shown in Fig. 3.

It will now be seen that when a brake pipe leak occurs which is sufficient to cause the operation of the vent valve device, the same first operates to vent fluid from the brake pipe at a service rate, so that warning will be given that a brake application is about to be effected and then the brake pipe is vented at the usual emergency rate, the vent valve finally closing to prevent the complete and unnecessary loss of brake pipe pressure.

Having now described my invention, what I claim as new and desire to secure by Letters Patent, is:—

1. In a fluid pressure brake, the combination with a brake pipe, of a vent valve device operated upon a predetermined reduction in brake pipe pressure for first gradually venting fluid from the brake pipe and then suddenly.

2. In a fluid pressure brake, the combination with a brake pipe, of a vent valve device operated upon a predetermined reduction in brake pipe pressure for initially venting fluid from the brake pipe at a service rate and then at an emergency rate.

3. In a fluid pressure brake, the combination with a brake pipe, of a vent valve device comprising a valve piston movable under a predetermined reduction in brake pipe pressure for opening a restricted communication for venting fluid from the brake pipe and adapted upon a further movement to open a larger connection for venting fluid from the brake pipe at a more rapid rate.

4. In a fluid pressure brake, the combination with a brake pipe, of a vent valve device comprising a valve piston movable under a predetermined reduction in brake pipe pressure for opening a restricted communication for venting fluid from the brake pipe and adapted upon a further movement to open a larger communication for venting fluid from the brake pipe at a more rapid rate, and upon a still further movement to close communication through which fluid is vented from the brake pipe.

In testimony whereof I have hereunto set my hand.

WALTER V. TURNER.

Copies of this patent may be obtained for five cents each, by addressing the "Commissioner of Patents, Washington, D. C."